United States Patent [19]

Kato

[11] Patent Number: 5,736,242
[45] Date of Patent: Apr. 7, 1998

[54] SUPPORT FOR PHOTOGRAPHIC PRINTING PAPER

[75] Inventor: Shinji Kato, Shizuoka, Japan

[73] Assignee: Fuji Photo Film Co., Ltd., Kanagawa, Japan

[21] Appl. No.: 580,513

[22] Filed: Dec. 28, 1995

[30] Foreign Application Priority Data

Dec. 28, 1994 [JP] Japan .................................. 6-339644

[51] Int. Cl.$^6$ .................................................. B32B 27/32
[52] U.S. Cl. .......................... 428/335; 428/336; 428/509; 428/513; 428/516; 430/496; 430/538
[58] Field of Search ................................ 428/515, 516, 428/218, 513, 336, 335, 509; 430/496, 538

[56] References Cited

U.S. PATENT DOCUMENTS

| | | | |
|---|---|---|---|
| 5,104,722 | 4/1992 | Kojima et al. | 428/218 |
| 5,182,161 | 1/1993 | Noda et al. | 428/195 |

FOREIGN PATENT DOCUMENTS

| | | | |
|---|---|---|---|
| 1-280752 | 11/1989 | Japan | G03C 1/87 |
| 2-289845 | 11/1990 | Japan | G03C 1/79 |
| 3-249753 | 11/1991 | Japan | G03C 1/79 |

*Primary Examiner*—E. Rollins Buffalow
*Assistant Examiner*—D. Lawrence Tarazano
*Attorney, Agent, or Firm*—Sughrue, Mion, Zinn, Macpeak & Seas, PLLC

[57] ABSTRACT

A support for a photographic printing paper comprising a substrate having a back side on which side an emulsion layer is not coated and a front side, and both sides of the substrate are coated with a waterproof resin coating. The waterproof resin coating on the back side of the substrate is a multi-layer laminate comprising an upper resin layer and a lower resin layer provided nearer to the substrate than the upper layer. The lower resin layer contains high density polyethylene having an MFR of not less than 8 in an amount of not less than 90% by weight based on the total weight of resin. Furthermore, the lower resin layer is thinner than the upper layer.

13 Claims, No Drawings

SUPPORT FOR PHOTOGRAPHIC PRINTING PAPER

FIELD OF THE INVENTION

The present invention relates to a support for a photographic printing paper comprising a substrate having coated on both sides thereof waterproof resin layers. More particularly, the waterproof resin layer strongly adheres to the back side of the substrate on which side an emulsion is not coated. Furthermore, the inventive support has excellent in curling resistance.

BACKGROUND OF THE INVENTION

In recent years, a support for a photographic printing paper comprising a substrate having coated on both sides thereof waterproof resin layers such as polyethylene or polypropylene has been widely used. This type of support for a photographic printing paper is advantageous in that expansion and shrinkage due to changes in humidity are less as compared to cellulose paper such as baryta paper. On the other hand, the cutting property of such a support is inadequate. As a result, a part of the resin remains on the edge face of the cutting plane because the substrate does not strongly adhere to the waterproof resin layer. Furthermore, after a light-sensitive emulsion is coated thereon, the support tends to curl due to changes in moisture content of the emulsion layer.

Therefore, various resin coating layers on the back side of the substrate on which side an emulsion is not coated have been proposed to solve the above described problems.

For example, JP-A-1-280752 (the term "JP-A" as used herein refers to a "published unexamined Japanese patent application") proposes a support for a photographic printing paper having a resin coating layer on the back side of the substrate comprising two polyethylene layers having different densities. The density of the polyethylene layer farther from the substrate is higher than that of the layer nearer to the substrate, and the average value of the densities of the two layers is 0.950 or less.

The curling resistance and the cutting property can certainly be improved with this photographic printing paper support. However, because a resin layer having a relative high density adheres to the base paper, the adhesion of the resin layer with the base paper becomes unnecessarily large. As a result, neck-in becomes large when laminating the resin on the base paper such that the manufacturing productivity of this support is inadequate.

Furthermore, JP-A-2-289845 discloses a support for a photographic printing paper such that the resin layer adhering to the base paper of the two resin layers on the back side comprises 50 wt % or more of a low density polyethylene resin, and the layer farther from the base paper comprises 75 wt % or more of a high density polyethylene resin.

However, although the adhesion of the base paper with the polyethylene resin layer of this support is sufficient, the abrasion resistance thereof is inadequate because the ratio of the high density polyethylene in the layer farther from the base paper is high.

In addition, JP-A-3-249753 proposes a support for a photographic printing paper wherein the resin layer on the back side of the substrate comprises a three layer structure. In this case, the intermediate layer comprises a resin having a high density polyethylene content of 70 wt % or more, and the other two layers comprise a resin having a low density polyethylene content of 40 wt % or more.

However, with the increase in the ratio of the high density polyethylene in the intermediate layer, not only the neck-in becomes large, when laminating, to thereby deteriorate processability, but also uneven thicknesses of the three layers in the width direction tends to occur.

SUMMARY OF THE INVENTION

In view of the above problems of the prior art, an object of the present invention is to provide a support for a photographic printing paper coated with a waterproof resin which has excellent cutting properties, curling resistance, uniformity of the resin thickness in the width direction during production and, furthermore, superior manufacturing capability.

Accordingly, the present inventors have extensively investigated adhesion of the base paper with the resin layer and have sought to prevent neck-in when laminating. Based thereon, the present inventors have found that adhesion of the base paper with the resin layer can be improved by using high density polyethylene having an MFR of 8 or more. The problem of neck-in when laminating can be prevented even if high density polyethylene is used in high ratio in the resin layer nearer to the base paper (for a resin coating layer having a two layer structure on the back side of the substrate) by making the thickness of the resin layer nearer the base paper (hereinafter referred to as the lower layer) smaller than that of the resin layer farther from the base paper (hereinafter referred to as the upper layer). Furthermore, the thickness in the width direction becomes uniform.

The above objects of the present invention have been attained by a support for a photographic printing paper comprising a substrate having a back side on which side an emulsion layer is not coated and a front side, and both sides of the substrate are coated with a waterproof resin layer, wherein the waterproof resin coating on the back side of the substrate is a multi-layer laminate comprising an upper resin layer and a lower resin layer provided nearer to the substrate than the upper layer, the lower resin layer contains high density polyethylene having an MFR of not less than 8 in an amount of not less than 90% by weight based on the total weight of resin, and the lower layer is thinner than the upper layer.

DETAILED DESCRIPTION OF THE INVENTION

The substrate for use in the present invention is not particularly limited, and can be a paper such as natural pulp paper comprising natural pulp as a main component, a mixed paper of natural pulp and a synthetic fiber, synthetic fiber paper comprising a synthetic fiber as a main component, and imitation paper of a synthetic resin film such as polystyrene and polypropylene (namely, synthetic paper). Of these, natural pulp paper (hereinafter referred to as base paper) is particularly preferably used.

Various additives can be added to the base paper, for example, a filler such as an alkyl ketene dimer, clay, talc, calcium carbonate and a urea resin in the form of fine grains, a sizing agent such as rosin, a higher fatty acid ester, paraffin wax and alkenyl succinic acid, a paper strength intensifier such as polyacrylamide, and a fixing agent such as aqueous aluminum sulfate ($Al_2(SO_4)_3$). In addition to the above, a dye, a fluorescent dye, a slime controller and a defoaming agent can be added, as needed.

Furthermore, the following softening agents can be added to the base paper, as needed.

Useful softening agents are described, for example, in Paper Making Bulletin, compiled by Shiyaku Time Co., Ltd., pages 554 to 555 (1980), and particularly those having a molecular weight of 200 or more are preferred. Such a softening agent is an amine salt or a quaternary ammonium salt having a hydrophobic group having 10 or more carbon atoms and is capable of self fixation with cellulose.

Specific examples of the softening agent include a reaction product of maleic anhydride copolymer and polyalkylenepolyamine, a reaction product of higher fatty acid and polyalkylenepolyamine, a reaction product of urethane alcohol and an alkylating agent, and a quaternary ammonium salt of higher fatty acid. Of these, a reaction product of maleic anhydride copolymer and polyalkylenepolyamine and a reaction product of urethane alcohol and an alkylating agent are particularly preferred.

A surface sizing treatment can be carried out on the surface of a pulp using a film forming polymer such as gelatin, starch, carboxymethyl cellulose, polyacrylamide, polyvinyl alcohol or modified products of polyvinyl alcohol. Examples of the modified product of polyvinyl alcohol include those modified with a carboxyl group, those modified with silanol, and copolymers with acrylamide. The coating amount of the film forming polymer is from 0.1 to 5.0 g/m$^2$, preferably from 0.5 to 2.0 g/m$^2$.

Furthermore, an antistatic agent, a fluorescent brightener, a pigment or a defoaming agent may be added to the above film forming polymer, as needed.

The base paper is produced from a slurry containing the above described pulp and additives optionally added such as a filler, a sizing agent, a paper strength intensifier and a fixing agent. The slurry is then processed with a paper making machine such as a Fourdrinier machine, dried and wound. The above described surface sizing treatment is carried out before or after drying, and a calendering treatment is carried out between drying and winding.

The calendering treatment may be carried out either before or after the surface sizing treatment when the surface sizing treatment is carried out after drying, but it is preferably carried out during the finishing process after various treatments have been conducted. Known metal rolls and elastic rolls commonly used in paper making can be used in the calendering treatment.

The surface smoothness of the base paper for use in the support of the present invention largely affects the smoothness of the final product, namely, printing paper. Therefore, use of a base paper having high surface smoothness is preferred. Examples of base papers having high surface smoothness include, for example, the paper having a Beck smoothness of 95 sec or more disclosed in JP-A-58-37642, the paper containing voids having a pore size of 0.4 µm or less in an amount of 0.04 ml or more (as determined by the method of mercury penetration) disclosed in JP-A-60-67940, the paper having a center line average roughness of 3.0 µm or less in the entire wavelength range measured by a three dimensional roughness meter disclosed in JP-A-63-291054, the one side glazing paper disclosed in JP-A-1-59229, the paper having a density of from 1.0 to 1.2 g/cm$^3$ disclosed in JP-A-1-59230, and the paper having an optical surface roughness of 10 µm or less disclosed in JP-A-1-80948. The substrate for use in the present invention generally has a thickness of from 70 to 180 µm.

Waterproof resins for the resin coating on the front side of the substrate, on which side a photographic emulsion layer is coated, can be suitably selected from resins capable of being melt-extruded at from 220° to 340° C. Polyolefin resins such as polyethylene and polypropylene and polyester resins are usually used as such waterproof resins, and polyethylene is particularly preferably used. Any of high density polyethylene, low density polyethylene, and linear low density polyethylene can be used as the polyethylene, and they may be used alone or two or more of them may be used in admixture.

The resin coating on the front side of the substrate having an emulsion layer may comprise two or more layers as the resin layer on the back side, but at least the waterproof resin used in the resin layer in contact with the substrate preferably has a melt flow rate (MFR) at a temperature of 190° C. according to JIS K7210 of from 1.2 to 100 g/10 min to ensure good adhesion with the substrate.

The above described waterproof resin layer can contain a tackifying resin and/or an adhesive resin such as an acid modified polyolefin resin capable of heat melting with a waterproof resin, and an ionomer, to ensure good adhesion with the substrate.

Examples of the above tackifying resin include a rosin derivative resin, a terpene resin (e.g., high molecular β-pinene), a coumarone-indene resin and a petroleum hydrocarbon resin.

The tackifying resin is generally used in an amount of from 0.5 to 60 wt % based on the weight of the above described waterproof resin.

Examples of the above described adhesive resin include, for example, an acid modified polyolefin resin, an ionomer, an ethylene-vinyl acetate copolymer resin (an EVA resin), an ethylene-ethylacrylate copolymer resin (an EEA resin), an ethylene-acrylic acid copolymer resin (an EAA resin), and the metal salts thereof. The adhesive resin is generally used in an amount of from 20 to 500 wt % based on the weight of the above waterproof resin.

In the present invention, the waterproof resin coating on the back side of the substrate on which an emulsion is not coated comprises two layers. Of these two layers, 90 wt % or more of the resin of the lower layer adhering with the base paper (the layer nearer the substrate) must be high density polyethylene (HDPE) having an MFR according to JIS K7210 of 8 or more. If the amount of HDPE is less than 90 wt %, curling resistance is not sufficient, and if the MFR is less than 8, impregnation of HDPE into the base paper is reduced such that sufficient adhesion cannot be obtained.

The high density polyethylene for use in the present invention preferably has a density of not less than 0.960 g/cm$^3$, and an MFR of from 0.001 to 30 g/10 min at a temperature of 190° C. and under a load of 2 kg.

In addition, in the present invention, the thickness of the above described lower layer must be thinner than that of the upper layer (of the two layers on the back side, the layer farther from the substrate). By employing this structure, neck-in which tends to occur when laminating the lower layer comprising HDPE in an amount of 90 wt % or more can be prevented. Furthermore, the thicknesses of all the resin layers in the width direction of the support can be made more uniform. In a preferred embodiment, the lower layer is thinner than the upper layer by not less than 15% of thickness of the upper layer.

Resins which can be used as the resins for the lower layer other than the above described HDPE having an MFR of 8 or more include the above described resins for use in the resin layer formed on the front side of the substrate.

Resins for use in the upper layer preferably include at least one polymer selected from low density polyethylene, linear low density polyethylene, high density polyethylene, a polypropylene homopolymer, a polypropylene copolymer (e.g., a polypropylene-ethylene copolymer, a polypropylene-ethylene-butene copolymer) and a mixture of polypropylene and low density polyethylene, particularly preferably selected from low density polyethylene, linear low density polyethylene and high density polyethylene, and most preferably a mixture of high density polyethylene and low density polyethylene. The mixing ratio by weight of high density polyethylene/low density polyethylene is generally from 30/70 to 70/30, and the density of the low density polyethylene is generally from 0.920 to 0.930 g/cm$^3$.

In a preferred embodiment, the average value of the density of the upper resin layer and the density of the lower resin layer constituting the laminated waterproof resin layer formed on the back side of the substrate is in the range of from 0.950 to 0.970 g/cm$^3$.

In the present invention, the waterproof resin layer on the front side of the substrate, on which side an emulsion layer is formed, preferably contains titanium oxide and a blueing agent.

The above titanium oxide is preferably titanium dioxide for improving the resolving power of the product.

The addition amount of the titanium oxide is preferably from 5 to 25 wt %, particularly preferably from 10 to 20 wt %. If the amount is less than 5 wt %, the resolving power of the photographic printing paper is not sufficient. If the titanium oxide amount exceeds 25 wt %, the product cost increases, the film tends to break and dye streaks tends to form, thereby resulting in inferior manufacturing capability.

The titanium oxide may be either of an anatase-type or a rutile-type, but an anatase-type is preferably used to enhance whiteness, and a rutile-type is preferably used to enhance sharpness. Furthermore, considering both whiteness and sharpness, a mixture of an anatase-type and a rutile-type may be used, or two layers each containing titanium oxide may be used, with one layer containing anatase-type titanium oxide and the other layer containing rutile-type titanium oxide.

The average grain size of the titanium oxide is preferably from 0.1 to 0.4 µm. When the average grain size is less than 0.1 µm, uniform mixed dispersion in the resin layer is difficult, whereas when the average grain size exceeds 0.4 µm, sufficient whiteness cannot be obtained. Also, protrusions are generated on the surface of the resin layer which adversely affect the image quality.

The titanium oxides having these forms and average grain size include, for example, KA-10 and KA-20 (trade names, manufactured by Titan Kogyo K.K.), and A-220, PF-656, PF-654, PF-671, PF-715, CR-63 (trade names, manufactured by Ishihara Sangyo Kaisha, Ltd.).

To control the activity thereof and to prevent yellowing, in general, the titanium oxide surface is treated with an inorganic material such as aluminum oxide hydrate or silicon oxide hydrate, an organic material such as a polyhydric alcohol, polyhydric amine, metal soap, alkyl titanate or polysiloxane, or a combination of inorganic and organic treating agents.

The treating agents can be used in an amount of from 0.2 to 2.0 wt % based on the titanium oxide for inorganic materials and from 0.1 to 1.0 wt % for organic materials.

Titanium oxide is kneaded into the waterproof resin using dispersion aids such as a metal salt of a higher fatty acid, an ethyl of a higher fatty acid, a higher fatty acid amide or a higher fatty acid with kneading machines such as a twin roll mill, a triple roll mill, a kneader, or a Banbury mixer. The thus-obtained titanium oxide-containing waterproof resin is formed in the form of pellets and the pellets are used as a master batch.

The waterproof resin coating on the front side of the substrate may be a single layer or may be a multilayer. In the case of two layers, to improve the resolving power of the product, the concentration of $TiO_2$ in the layer of the emulsion coated side (outer layer) is preferably higher than that in the layer of the base paper side (inner layer).

In general, the concentration of $TiO_2$ in the outer layer is from 10 to 40 wt % and the film thickness of the outer layer is from 5 to 30 µm, and the concentration of $TiO_2$ in the inner layer is from 0 to 20 wt % and the film thickness of the inner layer is from 5 to 30 µm. The waterproof resin layer on the front side of the substrate generally has a thickness of from 15 to 65 µm whether it comprises a single layer or two layers. In the case of two layers, the thickness proportion of the outer layer to the inner layer is preferably in the range of from 7/1 to 1/4.

As waterproof resins for inner and outer layers, LDPE, L-LDPE, PP, HDPE, an α-olefin copolymer (e.g., an ethylene-propylene copolymer, an ethylene-butene copolymer) and mixtures of these can be used.

Furthermore, three layers comprising an upper layer, an intermediate layer and a lower layer from the emulsion coated side may be provided on a substrate and $TiO_2$ may be added to each of the three layers in an amount of 15 wt % or more for improving the resolving power. However, when three layers are simultaneously provided by co-extrusion, if the concentrations of $TiO_2$ in the upper and lower layers are too high, defects such as streaking are liable to occur due to icicle-like foreign matter which adheres to the die lips of the extruder.

Accordingly, taking productivity into consideration, the concentration of $TiO_2$ in the intermediate layer is preferably high and the concentrations in the upper and lower layers are controlled so as not to deteriorate the resolving power.

In general, the concentration of $TiO_2$ in the upper layer is from 0 to 40 wt %, preferably from 0 to 20 wt %, the concentration of ultramarine blue is from 0 to 1 wt %, and the film thickness is from 0.2 to 10 µm, the concentration of $TiO_2$ in the intermediate layer is from 15 to 50 wt %, the concentration of ultramarine blue is from 0 to 1 wt %, and the film thickness is from 5 to 50 µm, and the concentration of $TiO_2$ in the lower layer is from 0 to 40 wt %, preferably from 0 to 20 wt %, the concentration of ultramarine blue is from 0 to 1 wt %, and the film thickness is from 0.5 to 20 µm.

As the waterproof resin for the upper layer, high density polyethylene (HDPE), polypropylene (PP), linear low density polyethylene (L-LDPE), an α-olefin copolymer or a mixture thereof is preferably used.

In the intermediate layer, low density polyethylene (LDPE) and L-LDPE are preferably used, and in the lower layer, LDPE is preferably used, but HDPE, PP, an α-olefin copolymer and mixtures thereof can be preferably used as in the upper layer.

The waterproof resin coating of the present invention may contain an antioxidant. An addition amount of from 50 to 1,000 ppm based on the amount of the waterproof resin is preferred for preventing deterioration of the resin without adversely affecting photographic properties.

The thus-prepared master batch pellets containing titanium oxide and/or a blueing agent are optionally diluted with waterproof resins and used for coating.

Next, the waterproof resin coating of the present invention is formed on the substrate comprising paper or synthetic paper using either a successive laminating method or laminating with a co-extruding die such as a feet block type, a multi-manifold type or a multi-slot type die.

The form of the co-extruding die is not particularly limited but, in general, a T-die and a coat hanger die are preferably used.

In the present invention, before resins are coated onto the substrate, the substrate is preferably subjected to an activating treatment such as a corona discharge treatment, a flame treatment, a glow discharge treatment, an electron beam irradiation treatment, an atmospheric pressure plasma treatment or a low temperature plasma treatment.

In the present invention, the thickness of the waterproof resin coating is not particularly limited. With respect to the thicknesses of the waterproof resin layers on the back side of the substrate, the film thickness of the upper layer is preferably from 5 to 35 μm, more preferably from 10 to 25 μm, and most preferably from 10 to 20 μm, and the film thickness of the lower layer is set thinner than that of the upper layer. The lower layer preferably has a thickness of from 3 to 25 μm, more preferably from 5 to 15 μm.

The surface of the waterproof resin layer on the front side of the substrate may be embossed with a glossy face, the fine face disclosed in JP-A-55-26507, a mat face, or a silky face, and the surface of the waterproof resin layer provided on the back side of the substrate may be embossed with a mat face. The surface roughness Rz according to JIS B0601 after embossing is generally from about 4.0 to 10 μm.

The surface after being embossed may be subjected to an activating treatment such as a corona discharge treatment and a flame treatment, and after the activating treatment, the surface of the resin layer can be subjected to an undercoating treatment as disclosed in JP-A-61-846443.

The resin layer provided on the back side of the substrate for use in the support of the present invention may be coated with various additives suitably selected, in combination, from the inorganic antistatic agents, the organic antistatic agents, the hydrophilic binders, the latexes, the hardening agents, the pigments and the surfactants disclosed or exemplified in JP-B-52-18020 (the term "JP-B" as used herein refers to an "examined Japanese patent publication"), JP-B-57-9059, JP-B-57-53940, JP-B-58-56859, JP-A-59-214849, and JP-A-58-184144.

The support for the photographic printing paper of the present invention can be used for various applications by coating thereon an appropriate photographic constitutional layer. Examples thereof include a color photographic printing paper, a black-and-white photographic printing paper, a printing paper for a photo-composition, a reversal photographic material, a negative and positive for a silver salt diffusion transfer process and a printing material. For example, silver chloride, silver bromide, silver chlorobromide, silver iodobromide, and silver chloroiodobromide emulsion layers can be coated on the support. Multilayer silver halide color photographic constitutional layers may be provided as the emulsion layer by incorporating color couplers into the silver halide photographic emulsion layers.

EXAMPLES

The present invention will be described in further detail with reference to the following Examples, but the present invention should not be construed as being limited thereto. All parts and ratios are by weight unless otherwise noted.

Examples 1–7 and Comparative Examples 1–5

The wire face of a paper substrate having a width of 40 cm and a basis weight of 165 g/m² was subjected to corona discharge treatment at an output of 1 kw. Then, polyethylene resins having the compositions shown in Table 1 were laminated on the wire face by co-extrusion at 320° C. at a line speed of 230 m/min to provide waterproof polyethylene resin layers having a total thickness of 20 μm. The density of the HDPE, LDPE, PP and L-LDPE used in Examples are 0.964 g/cm³, 0.923 g/cm³, 0.944 g/cm³ and 0.948 g/cm³, respectively.

TABLE 1

| | Material Used | | Thickness of the Resin Layer (μm) | | MFR of HDPE on the Lower Layer Side (g/10 min) | Adhesion (g/15 mm) | Curling (mm) | Thickness Uniformity in the Width Direction |
|---|---|---|---|---|---|---|---|---|
| | Upper Layer | Lower Layer | Upper Layer | Lower Layer | | | | |
| Comp. Ex. 1 | HDPE/LDPE = 50/50 | HDPE alone | 12 | 8 | 6 | D | normal | B |
| Comp. Ex. 2 | HDPE/LDPE = 50/50 | " | 8 | 12 | 10 | B | bad | C |
| Example 1 | HDPE/LDPE = 50/50 | " | 12 | 8 | 8 | C | normal | B |
| Example 2 | HDPE/LPDE = 50/50 | " | 12 | 8 | 11 | B | normal | B |
| Example 3 | HDPE/LPDE = 50/50 | " | 12 | 8 | 20 | A | normal | B |
| Example 4 | HDPE/LPDE = 50/50 | " | 15 | 5 | 20 | A | normal | A |
| Comp. Ex. 3 | poly-propylene/ LDPE = 80/20 | HDPE/LDPE = 50/50 | 12 | 8 | 15 | A | bad | B |
| Comp. Ex. 4 | poly-propylene/ LDPE = 80/20 | HDPE/LDPE = 70/30 | 8 | 12 | 15 | A | bad | C |
| Comp. Ex. 5 | poly-propylene/ LDPE = 80/20 | HDPE/LDPE = 70/30 | 10 | 10 | 15 | A | bad | B-C |

TABLE 1-continued

| | Material Used | | Thickness of the Resin Layer (μm) | | MFR of HDPE on the Lower | | | Thickness Uniformity |
| --- | --- | --- | --- | --- | --- | --- | --- | --- |
| | Upper Layer | Lower Layer | Upper Layer | Lower Layer | Layer Side (g/10 min) | Adhesion (g/15 mm) | Curling (mm) | in the Width Direction |
| Example 5 | polypropylene/ LDPE = 80/20 | HDPE/LDPE = 90/10 | 11 | 9 | 15 | A | normal | B |
| Example 6 | L-LDPE | HDPE/LDPE = 90/10 | 12 | 8 | 15 | A | normal | B |
| Example 7 | " | HDPE/LDPE = 90/10 | 15 | 5 | 15 | A | normal | A |

Next, a titanium-containing waterproof resin layer comprising low density polyethylene was extrusion laminated on the front side of the paper substrate at a temperature of 320° C., a thickness of 30 μm, to thereby obtain a support for a photographic printing paper of the present invention. The $TiO_2$ concentration of the waterproof resin layer was 20 wt %.

The thus-obtained support for a photographic printing paper was coated with a colored emulsion and the thus prepared printing paper was evaluated for curling property, uniformity of the thickness in the width direction of the resin layer on the back side thereof (perpendicular to the lamination direction) and adhesion. The results obtained are shown in Table 1.

Evaluation of Curling Property:

The printing paper was cut to a size of 12.7 cm×12.7 cm and a curling property was evaluated using the values obtained by the addition of average value A of the rising of the four corners when conditioned at 25° C. and 20% RH, and the absolute value |B| of the average value B of the rising of the four corners when conditioned at 25° C. and 80% RH.

Good: A+|B|≦12 mm

Normal: 12 mm≦A+|B|≦18 mm

Bad: A+|B|≦18 mm

Evaluation of Uniformity of Thickness:

The thickness of all the resin layers on the back side was measured in the width direction, and a thickness of within 20 μm±1 μm was taken as A, that of 20 μm±1 μm to 2 μm as B, and that of 20 μm±2 μm or more as C.

Evaluation of Adhesion:

The evaluation was conducted by pulling a sample, the back side of which was punched 15 mm wide in the machine direction (MD) with a distance between chucks of 50 mm, at a peel angle of 80° and a tensile speed of 50 mm/min. The peeling strength was evaluated according to the following three grades.

A: Base paper layer did not peel (good)

B: 350 g/15 mm or more

C: 350–300 g/15 mm

D: Less than 300 g/15 mm (bad)

The results in Table 1 show that the support for a photographic printing paper of the present invention provides a photographic printing paper having well balanced qualities.

According to the support for the photographic printing paper of the present invention, neck-in which tends to occur during laminating can be reduced, thereby resulting in uniform thickness of the resin layers in the width direction in producing thereof. Furthermore, because a large content of HDPE is used, excellent curling resistance is attained.

While the invention has been described in detail and with reference to specific examples thereof, it will be apparent to one skilled in the art that various changes and modifications can be made therein without departing from the spirit and scope thereof.

What is claimed is:

1. A photographic printing paper comprising a substrate having a back side on which side an emulsion layer is not coated and a front side, and both sides of the substrate are coated with a waterproof resin coating, wherein said waterproof resin coating on the back side of said substrate is a multilayer laminate comprising an upper resin layer and a lower resin layer provided nearer to the substrate than the upper layer, and said lower resin layer is adhered to the substrate, the lower resin layer contains high density polyethylene having a melt flow rate of not less than 8 g/10 min. in an amount of not less than 90% by weight based on the total weight of resin, and the lower layer is thinner than the upper layer.

2. The photographic printing paper as claimed in claim 1, wherein the average value of the density of said upper resin layer and the density of said lower resin layer formed on the back side of the substrate is in the range of from 0.950 to 0.970 $g/cm^3$.

3. The photographic printing paper as claimed in claim 1, wherein said upper resin layer comprises at least one resin selected from the group consisting of low density polyethylene, linear low density polyethylene, high density polyethylene, a polypropylene homopolymer, and an α-olefin copolymer.

4. The photographic printing paper as claimed in claim 2, wherein said upper resin layer comprises at least one resin selected from the group consisting of low density polyethylene, linear low density polyethylene, high density polyethylene, a polypropylene homopolymer, and an α-olefin copolymer.

5. The photographic printing paper as claimed in claim 1, wherein the waterproof resin coating provided on the front side of the substrate contains titanium-oxide in an amount of from 5 to 25 wt %.

6. The photographic printing paper as claimed in claim 1, wherein the film thickness of the upper resin layer is from 5 to 35 μm.

7. The photographic printing paper as claimed in claim 1, wherein the film thickness of the upper resin layer is from 10 to 25 μm.

8. The photographic printing paper as claimed in claim 1, wherein the film thickness of the upper resin layer is from 10 to 20 μm.

9. The photographic printing paper as claimed in claim 1, wherein the lower resin layer consists of high density polyethylene.

10. The photographic printing paper as claimed in claim 1, wherein the waterproof coating provided on the front side of the substrate comprises three resin layers.

11. The photographic printing paper as claimed in claim 1, wherein the waterproof resin coating provided on the front side of the substrate contains ultramarine blue pigment.

12. The photographic printing paper as claimed in claim 3, wherein said α-olefin copolymer is selected from the group consisting of ethylene-propylene copolymer and ethylene-butene-propylene copolymer.

13. The photographic printing paper as claimed in claim 4, wherein said α-olefin copolymer is selected from the group consisting of ethylene-propylene copolymer and ethylene-butene-propylene copolymer.

* * * * *